US006584097B1

(12) United States Patent
Malik

(10) Patent No.: US 6,584,097 B1
(45) Date of Patent: Jun. 24, 2003

(54) SYSTEM AND METHOD FOR INTERNET RESERVATION SERVICE

(75) Inventor: Dale W. Malik, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/409,688

(22) Filed: Sep. 30, 1999

(51) Int. Cl.[7] ............................................... H04L 12/66
(52) U.S. Cl. ........................ 370/352; 709/226; 709/229
(58) Field of Search ........................... 379/15.01, 15.02, 379/15.03, 15.04, 201.01, 201.02, 201.04, 204.01, 204.02, 207.02, 207.05, 207.1, 207.11, 207.13, 207.14, 210.01, 210.02, 221.08, 221.09, 221.11; 370/351, 352, 354, 357, 385, 400, 410, 464, 465, 466; 709/220, 223, 226, 227, 229

(56) References Cited

U.S. PATENT DOCUMENTS

| 5,701,301 | A | | 12/1997 | Weisser, Jr. | |
|---|---|---|---|---|---|
| 5,761,290 | A | * | 6/1998 | Farris et al. | 379/221.11 |
| 5,774,533 | A | | 6/1998 | Patel | |
| 5,867,498 | A | * | 2/1999 | Gillman et al. | 370/385 |
| 5,898,839 | A | * | 4/1999 | Berteau | 709/227 |
| 5,915,008 | A | * | 6/1999 | Dulman | 379/221.08 |
| 5,933,490 | A | * | 8/1999 | White et al. | 379/221.01 |
| 6,084,875 | A | * | 7/2000 | Forrest | 370/355 |
| 6,112,305 | A | * | 8/2000 | Dancs et al. | 713/156 |
| 6,115,460 | A | * | 9/2000 | Crowe et al. | 379/211.02 |
| 6,181,787 | B1 | * | 1/2001 | Malik | 379/207.11 |
| 6,246,755 | B1 | * | 6/2001 | Walker et al. | 379/114.2 |
| 6,266,699 | B1 | * | 7/2001 | Sevcik | 709/229 |
| 6,292,479 | B1 | * | 9/2001 | Bartholomew et al. | 370/352 |
| 6,324,579 | B1 | * | 11/2001 | Bleuse et al. | 709/227 |
| 6,333,931 | B1 | * | 12/2001 | LaPier et al. | 370/385 |
| 6,335,968 | B1 | * | 1/2002 | Malik | 379/114.2 |
| 6,389,131 | B1 | * | 5/2002 | Aquino et al. | 379/230 |
| 6,415,027 | B1 | * | 7/2002 | Malik | 379/221.01 |
| 6,459,783 | B1 | * | 10/2002 | March et al. | 379/211.02 |
| 2002/0004833 | A1 | * | 1/2002 | Tonouchi | 709/229 |

OTHER PUBLICATIONS

Ely, Tom. "Intelligent Networks as a Solution for Internet Related Telephone Congestion". IEEE Intelligent Network Workshop. May 10–13, 1998. pp. 406–413.*
Atai et a. "Architectural Solutions to Internet Congestion Based on SS7 and Intelligent network Capabilities". Telcordia Technologies. Copyright 1997. pp. 1–17.*
Bellcore Technical Reference NWT–001284, Issue 1, "Advanced Intelligent Network (AIN) 0.1 Switching Systems Generic Requirements" (Aug. 1992).

* cited by examiner

Primary Examiner—Melvin Marcelo
Assistant Examiner—Derrick W. Ferris
(74) Attorney, Agent, or Firm—Shaw Pittman LLP

(57) ABSTRACT

A telecommunications system and method for reserving time slots for dialup access to Internet Service Providers. The present invention utilizes an Advanced Intelligent Network to collect reservation requests from subscribers and to process the dial-up connections during the reserved time slot. The present invention provides uses the telecommunications network infrastructure to generate bills for subscribers utilizing the reservation system. Subscribers are billed on a per use basis or may pre-purchase reservation slots which may be scheduled in the future.

36 Claims, 8 Drawing Sheets

SYSTEM AND METHOD FOR INTERNET RESERVATION SERVICE

BACKGROUND

1. Field of the Invention

The present invention relates generally to telecommunications systems. More particularly, the present invention relates to an advanced intelligent network system that provides reservation services for Internet Service subscribers.

2. Background of the Invention

Over the last ten years, use of the Internet has grown rapidly. A large segment of this growth stems from an increase in individual dial-up subscribers. These dial-up subscribers use the public switched telephone network ("PSTN") to establish connections to their Internet Service Providers ("ISPs"). FIG. 1 is a schematic diagram illustrating how these dial-up subscribers, or users, connect to their ISPs using PSTN 10. To support multiple connections, ISPs must maintain numerous telephone lines connected to modems. Rather than advertising a different telephone number for each telephone line, ISPs generally advertise a limited number of telephone access numbers. Each telephone access number corresponds to one or more telephone lines. These telephone lines may be made up of, e.g., individual POTS lines, one or more T1 lines, or Primary Rate ISDN ("PRI") lines. For simplicity, the figures and discussion herein show the connection to be made up of PRI lines 21, as shown in FIG. 1.

PRI lines 21 lead to the ISP 20 where they are connected to multi-line hunt group ("MLHG") 22 as shown in FIG. 1. MLHG 22 is a modem pool allowing multiple simultaneous connections and is controlled by access server 23. MLHG 22 takes incoming subscriber calls and routes them to the first open modem in the modem pool. When caller 30 dials the telephone access number for ISP 20 (using computer 31, modem 32 and subscriber line 33), PSTN 10 processes the call like any other call. That is, the call is routed between caller 30 and called party (in this case, ISP 20) through one or more switches. If the ISP's lines are all busy, or "off-hook", i.e., there are no voice communications paths available, the caller gets a busy-signal, which is provided by the PSTN. On the other hand, if lines are available, the ISP's switch will terminate the call and it is the ISP's responsibility to answer the call, verify the user authorization to access the ISP's system, and setup the caller's connection to the Internet.

From the ISP's point of view, several intervening steps must be accomplished before granting the caller access to the Internet. For example, when a call reaches ISP 20 via PRI lines 21 and MLHG 22, access server 23 answers the call. After answering the call, access server 23 must determine whether or not the caller should be granted access and if so, to which services. Access server 23 queries caller 30 for information such as a username and password for use in identifying caller 30 and caller 30's authorized services. The dialog between caller 30 and access server 23 is usually performed automatically between access server 23 and communications software operating on computer 31.

Generally, ISPs use centralized servers to store and manage their subscriber databases. Remote Authentication Dial-In User Service ("RADIUS") server 24, having database 24a, shown in FIG. 1, is functionally connected to access server 23 and provides this centralized management. Thus, access server 23 collects username and password information from caller 30 and passes it on to RADIUS server 24.

After RADIUS server 24 verifies caller 30's username and password, it provides access server 23 with configuration information specific to caller 30. Access server 23 uses the configuration information to provide the authorized services to caller 30. Access servers and RADIUS servers are described in more detail in commonly assigned U.S. patent application, Ser. No. 09/133,299, which is incorporated herein by reference in its entirety. Additional information on access servers and RADIUS servers may be found in Rigney et al., *Remote Authentication Dial-In User Service* (RADIUS), Network Working Group, January, 1997, or in Rigney et al., RADIUS Accounting, Network Working Group, April, 1997.

It is well known in the art that not all subscribers connect to their ISPs at the same time. Additionally, not all subscribers connect every day, nor do they connect for the same length of time each session. For this reason, it is not practical or realistic for ISPs to provide a 1:1 ratio of lines to subscribers. ISPs must pay their local telephone service providers for each telephone line maintained. Instead, ISPs have developed formulas to determine the appropriate number of telephone lines required. In general, a telephone line to user ratio of at least 1:10 provides an acceptable level of service. However, as Internet usage continues to grow, it is becoming more difficult to predict the requirements for telephone lines into an ISP.

As discussed above, a significant number of Internet subscribers connect using dial-up connections from their homes. These subscribers typically connect before or after work or school. As a result, there are certain peak times for accessing ISPs via the PSTN. During these peak times, subscribers may not be able to connect to their ISPs because all of the ISP's telephone lines are busy. As described above, ISPs cannot reasonably support every subscriber with simultaneous connections. However, if an ISP does not provide sufficient telephone lines to minimize subscriber frustrations due to failed connections, the ISP could lose current or future subscribers to competing ISPs. Thus, ISPs must balance their need to reduce costs against their subscribers' need for adequate access to the Internet.

One way to balance these competing interests is to obtain flexible access to increased telephone lines from local telephone service providers. Another means of balancing these interests is to provide a system and method for subscribers to reserve time slots with their ISPs. ISPs could create such a reservation by limiting access to reserved subscribers' accounts during peak periods. In such a system, subscribers would reserve a time slot, and the ISP would program its computers to allow log-ins only by those subscribers having reservations.

Such a reservation system may be effective for limiting the number of subscribers trying to access the ISP network. This may reduce the load on the ISP's systems and help ensure adequate processing speed for those subscribers already connected. However, such an ISP-based reservation system does not address the real problem of allocating the ISP's telephone and modem resources. This is true because non-reserved subscribers are not prevented from attempting access to the ISP's system. ISPs generally have no way of monitoring or scheduling telephone access to their systems. Every attempted login ties up a telephone line and modem for as long as it takes the ISP's authentication process to determine that the subscriber does not have a valid reservation. Additionally, significant changes to the existing billing structure employed by ISPs may be required. Thus there is a need for a more efficient reservation system directed to controlling use of the ISP's telephone access resources.

SUMMARY OF THE INVENTION

The present invention utilizes an Advanced Intelligent Network ("AIN") to provide an automated service for scheduling Internet time slots for ISP subscribers. AIN systems are described in U.S. Pat. No. 5,701,301 and U.S. Pat. No. 5,774,533 which are incorporated herein by reference in their entirety. FIGS. 2a through 3 show the key components of the AIN used in the present invention. FIGS. 4 and 5 are flowcharts detailing the two primary stages comprising the present invention: reservation setup and reservation processing. The steps described herein can be performed by computer-readable program code operating on the various AIN components and other computer systems, as described below.

The present invention is an AIN-based system and method that allows Internet subscribers to reserve time slots for accessing their ISPs via dial-up telephone connections. The system provides three alternatives that subscribers can use to make a reservation on the system. In all three cases, the subscriber identifies the time slot requested and the system returns a confirmation number if the reservation is successfully placed.

The first alternative allows pre-subscribed users, or "feature code users," to have their billing and other information such as the name of their ISP pre-entered into a system database. A suitable AIN trigger is provisioned on the pre-subscribed users' telephone lines. Such feature code users can use a simplified process for making their reservations. Additionally, in a preferred embodiment, feature code users may pre-pay for a designated number of reservation slots per month. When a pre-subscribed caller uses the assigned feature code to access the reservation system, a Service Control Point ("SCP") checks the customer database to determine the number of reservation slots the caller has available and processes the reservation request if slots are available.

In the second alternative, the present invention provides reserved Internet access to infrequent users, or "casual users." These casual users must provide billing and ISP information at the time of each use. Casual users access the reservation system by dialing a telephone access number assigned to the system. This access number for the reservation system is provisioned with a suitable AIN trigger. When a casual user calls the reservation system telephone access number, the trigger is activated and the call is temporarily suspended. This trigger initiates a database query to the SCP to determine which Service Node ("SN") should handle the reservation request. Alternatively, the telephone access number of the reservation system could correspond to a line physically assigned to a particular SN. However, using an AIN trigger and database query is preferable, because in that case the system can grow or be re-configured in a manner that is transparent to the subscribers. That is, any SN in the telephone network system can be used to collect the subscriber's reservation request without changing the telephone access number for the reservation system and without making the subscribers aware of the change. The SN collects the required information from the caller, then returns control of the call back to the SCP, together with the data collected. After processing the reservation request, the reservation system charges the subscribers for the service and relays the reservation details to the ISP.

The third alternative of the present invention allows both pre-subscribed and casual users to make their reservations, while online, through their ISP. Subscribers requesting a reservation time slot via the Internet are prompted for the same information required of a casual user. Such information includes the reservation time slot requested and the telephone number that will be used to initiate the call. The information is collected by the ISP and transmitted to a gateway server maintained by the telephone service provider. The gateway server sends the reservation request to the AIN components that process the request and return a reservation confirmation number. The ISP server relays the confirmation number to the subscriber, together with any special access instructions.

The reservation system database resides on the SCP and has records for each ISP with fields such as the ISP's capacity for reserved time slots and the ISP's telephone number for reserved access. Each time a caller reserves a time slot for an ISP, the SCP updates the database with the caller's telephone number, selected time slot and a confirmation number generated by the SCP. The caller is provided with the confirmation number for verification purposes in the event a reservation must be cancelled. Additionally, in an alternate embodiment, the confirmation number could be used by subscribed users for "roaming" access, i.e., access from a telephone number not in the SCP's database.

The ISP sets aside at least one telephone access number for use by subscribers having reserved time slots. When the subscriber's time slot arrives, the subscriber dials the ISP's reserved telephone access number. This reserved access number has a suitable AIN trigger assigned that activates a database query to the SCP. After confirming that the caller's telephone number is in the database for that time slot and for the particular ISP, the SCP responds by sending a Continue message and a Termination_Notification request to the SSP. Upon receiving the response, the SSP terminates the call to the ISP. The SSP subsequently notifies the SCP if the line is busy, was answered, or if the caller hung up before the call was answered. The SCP uses this information to determine the billing status for the call.

In an alternate embodiment, the SCP initiates the call between the customer and the ISP when the reserved time slot begins. In this embodiment, the SCP waits until the reserved time slot arrives, then issues a Create_Call message with a Termination_Notification request to the caller's SSP instructing the SSP to establish a call between that customer and the customer's ISP. As discussed above, the SSP notifies the SCP if the call is answered, busy or disconnected before answer.

If the line is busy, the SCP ensures that the caller is not billed for the reservation. Similarly, if the call is properly connected, and later disconnected for any reason, the caller may re-connect during the reserved time slot without being billed for a new reservation. Once the caller is connected to the ISP, the call can be disconnected when the time slot has expired using alternate methods.

For example, the ISP could ensure that the user is disconnected by hanging up the call at the appropriate time. The ISP could also transmit periodic warnings to the caller warning the caller of the impending disconnection. The ISP could also instruct the caller to disconnect and reconnect using a non-reserved telephone access slot, if one is available. Alternatively, the ISP could allow the caller to purchase additional time slots if slots are available, so that the caller is not forced to end the session.

It is an object of the present invention to provide an automated system for providing reservations for dial-up access to Internet Service Providers ("ISPs").

It is a further object of the present invention to use an Advanced Intelligent Network to provide billing support for Internet reservation systems.

It is another object of the present invention to provide a system for increasing Internet subscribers' chances of obtaining a connection to their ISPs.

These and other objects of the present invention are described in greater detail in the detailed description of the invention, the appended drawings and the attached claims.

DETAILED DESCRIPTION OF THE INVENTION

Figure 1:
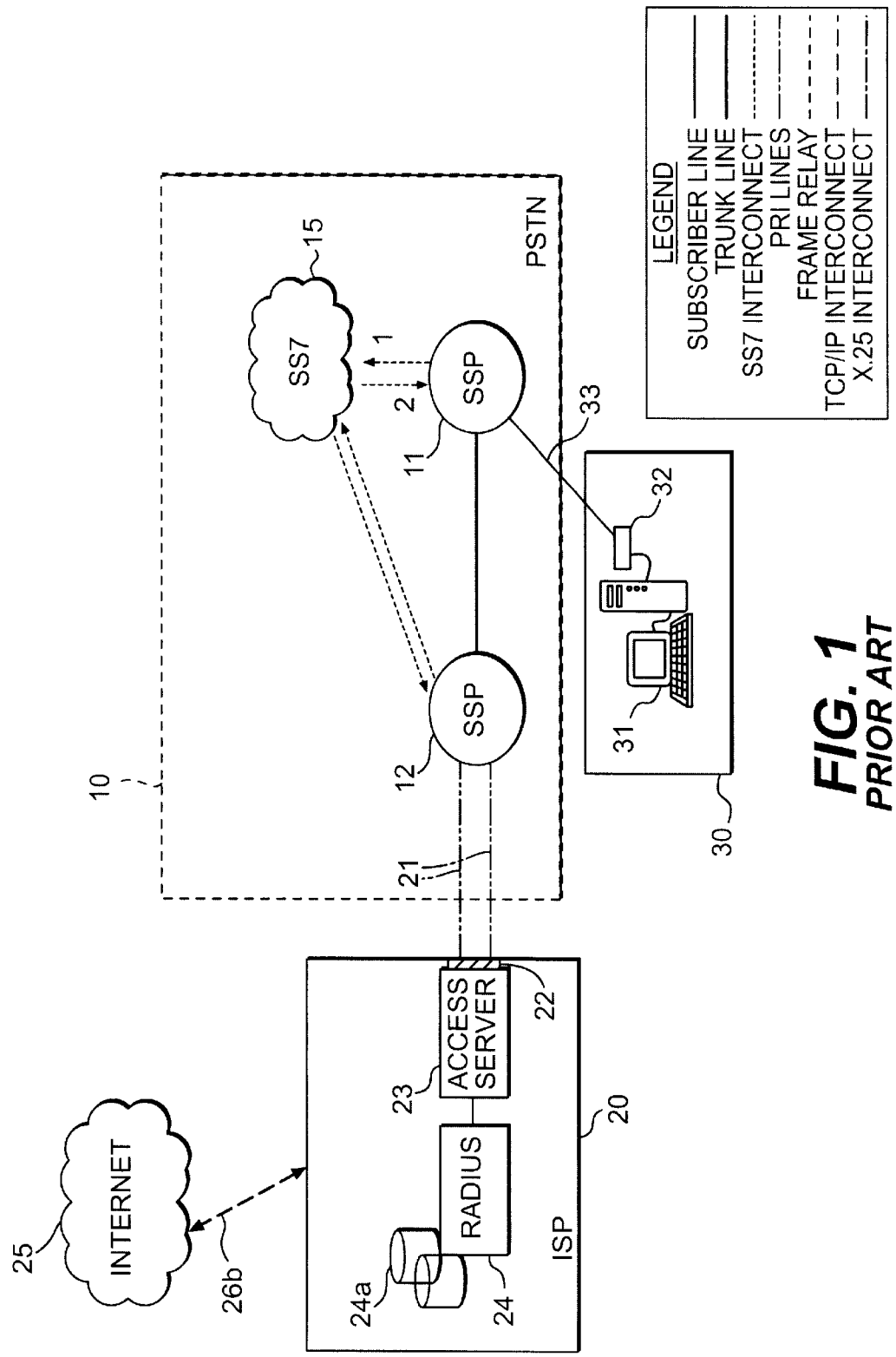
FIG. 1 is a schematic diagram showing how a dial-up subscriber accessed an Internet Service Provider ("ISP") in the prior art.
Figure 2A:
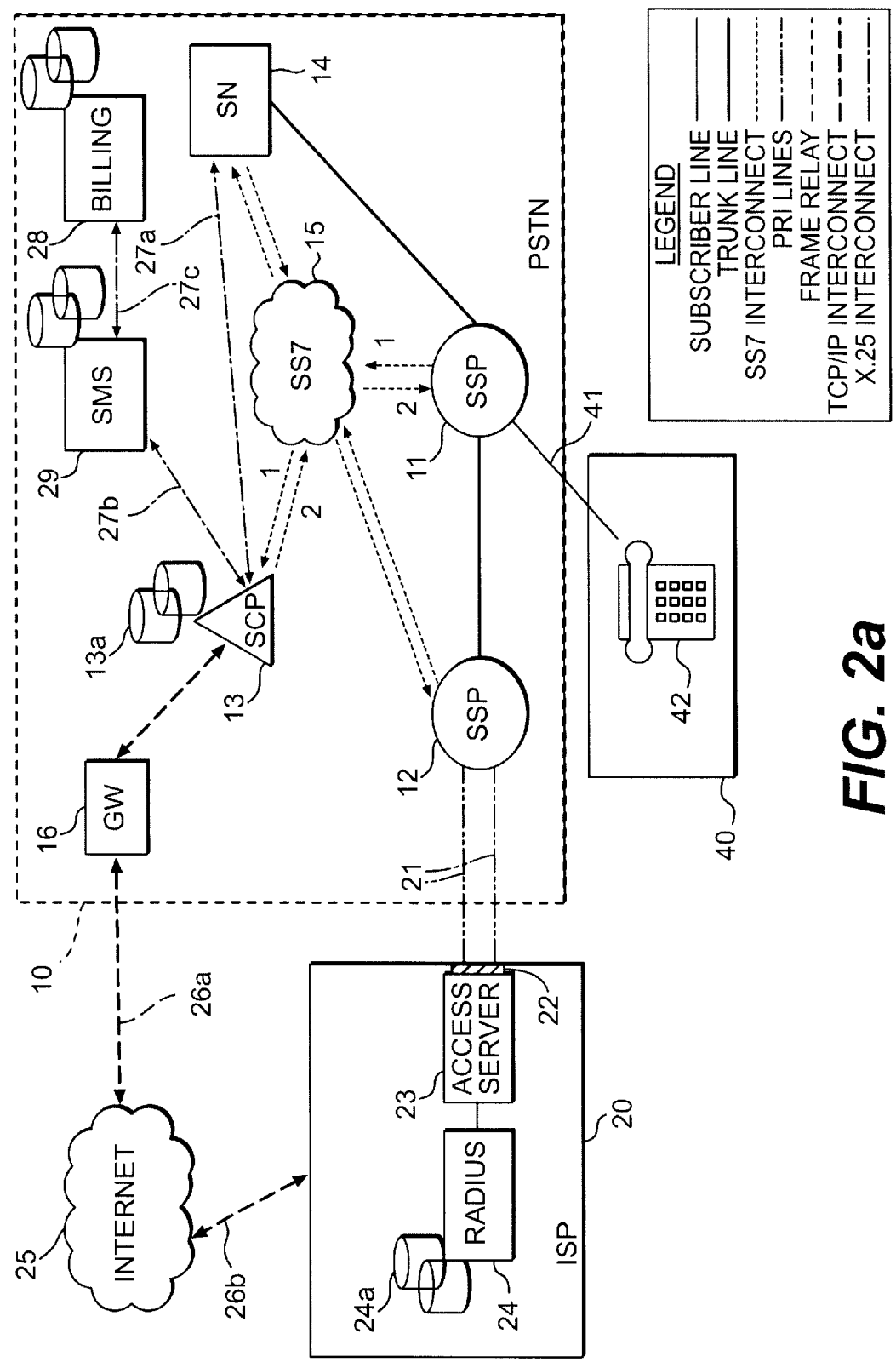
FIG. 2a is a schematic diagram showing the key components of an Advanced Intelligent Network ("AIN") used in an embodiment of the present invention, in which a pre-subscribed user places a reservation over the public switched telephone system.
Figure 2B:
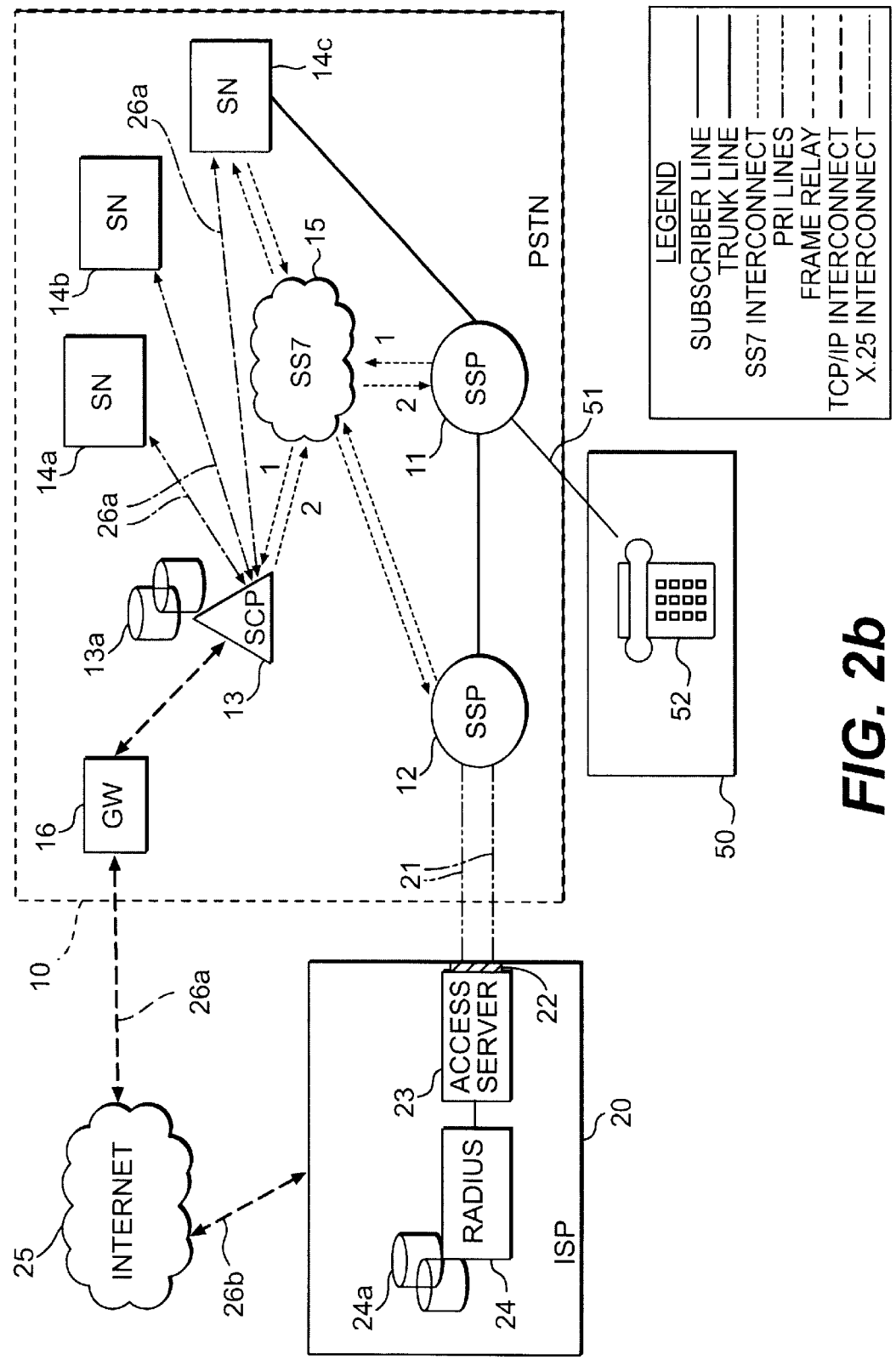
FIG. 2b is a schematic diagram showing the key components of an AIN used in an embodiment of the present invention, in which a casual user places a reservation over the public switched telephone system.

The present invention utilizes an Advanced Intelligent Network ("AIN") to provide an automated reservation system allowing Internet subscribers to schedule time slots for accessing their ISPs via dial-up telephone connections. FIGS. 2a–3 show the key components of the AIN used in the present invention. Like components shown in each of the figures are numbered identically, e.g., the ISP is identified as ISP 20 in all of the figures. AIN components used in the present invention include Service Switching Points ("SSPs") 11 and 12, Service Control Point ("SCP") 13, one or more Service Nodes ("SN") 14, and Common Channel Signaling System 7 ("SS7") data network 15. FIGS. 2a–3 show two distinct SSPs, the subscriber's SSP 11 and the ISP's SSP 12. The subscriber and the ISP could be served by the same SSP, or they could be served by distinct SSPs as shown in the figures. SCP 13 uses database 13a and service package applications ("SPAs"), such as an SPA implementing the present invention, to respond to queries from the SSPs. SN 14 is used to collect reservation requests from subscribers in the present invention, and is described more fully in Section B, below.

In addition to the AIN components, FIGS. 2a–3 show gateway server 16, which acts as a buffer between the telephone network 10 of the present invention and the Internet 25. (For simplicity, the Internet is labeled as item "25" in FIGS. 2a–3, but will only be referred to hereafter as "the Internet" without numeric identification). Gateway server 16 is connected to ISP 20 via the Internet through TCP/IP interconnections 26a and 26b. Alternatively, gateway server 16 could be directly connected to ISP 20 via a private high speed link.

ISP 20 and gateway server 16 share information such as the data collected or generated when a reservation is placed through ISP 20, or information regarding time slots remaining for reservation purposes. Gateway server 16 passes on to SCP 13 all such communications received from ISP 20. Database 13a serves as the master database of the reservation system of the present invention.

Database 13a may use a number of different tables to store the information required by the reservation system. In a preferred embodiment, database 13a has an ISP table and a subscriber table. The ISP table includes individual records for each ISP. Each record in the ISP table has numerous data fields for storing relevant information about each ISP. In a preferred embodiment, each record in the ISP table has the following data fields:

ISP-Name: The name of the ISP.

Reserved-Number: The telephone access number for subscribers of the ISP reservation service. As noted above, ISPs typically use telephone access numbers connected to multi-line hunt groups. In a preferred embodiment, at least one telephone access number is set aside for reserved subscribers. Once a user has obtained a valid reservation, the user is provided with a confirmation number and the telephone access number used to connect to the ISP.

Time Slot-Division: The methodology for dividing a 24-hour period into time slots. This methodology is dependent on the specific requirements of the ISP. For example, one ISP may find it desirable to offer time slots starting every hour, on the hour, while another ISP may wish to offer time slots every half of an hour. Similarly, an ISP may offer reservations every forty-five minutes. For simplicity, examples presented herein will divide the time slots into one hour periods, starting on the hour.

Slot-Max (Time slot, Max): A data array storing the maximum number of reserved time slots the ISP can support per time slot.

Slot-Used (Time slot, Number-Used, Confirmations): A data array storing the number of time slots reserved by subscribers for a given time slot, and the confirmation numbers for each time slot.

The subscriber table may be a table already maintained by a telephone service provider, or it may be a new table designed specifically to support the Internet reservation system of the preferred embodiment. The subscriber table has records storing relevant information about each subscriber using the Internet reservation system. In a preferred embodiment, the records in the subscriber table have the following data fields:

Number: The subscriber's telephone number.

ISP-1: The subscriber's primary ISP. In the event a user subscribes to multiple ISPs, multiple fields for identifying more than one ISP are provided.

ISP-2: The subscriber's secondary ISP, if one exists. Of course, additional fields could be added to support more than two ISPs if desired.

Pre-Paid-Per-Month: The total number of reservation slots the subscriber has pre-purchased for each month.

Pre-Paid-Remaining: The number of pre-purchased reservation slots remaining in the current month. At the beginning of each month, this data field is reset to the value of the Pre-Paid-Per-Month data field.

Confirmation-Numbers (Slot, Confirmation): A data array storing the active confirmation numbers for each slot currently reserved by the subscriber.

One of ordinary skill in the art will appreciate that there are many other ways of implementing the above identified database tables and data fields. The descriptions of the database tables, data field structure and data field contents herein are provided only as illustrative examples.

The present invention provides a system and method allowing Internet subscribers (hereinafter referred to as "callers," "subscribers" or "users") to reserve time slots for accessing their respective ISPs. The invention may be described as having two main stages: Reservation Setup and Reservation Processing. Flowcharts showing the steps undertaken in an embodiment of the present invention during the Reservation Setup and Reservation Processing stages are shown in FIGS. 4a and 4b, respectively. The steps described herein can be performed by computer-readable program code operating on the various AIN components and other servers, as described below.

Reservation Setup

Figure 4:
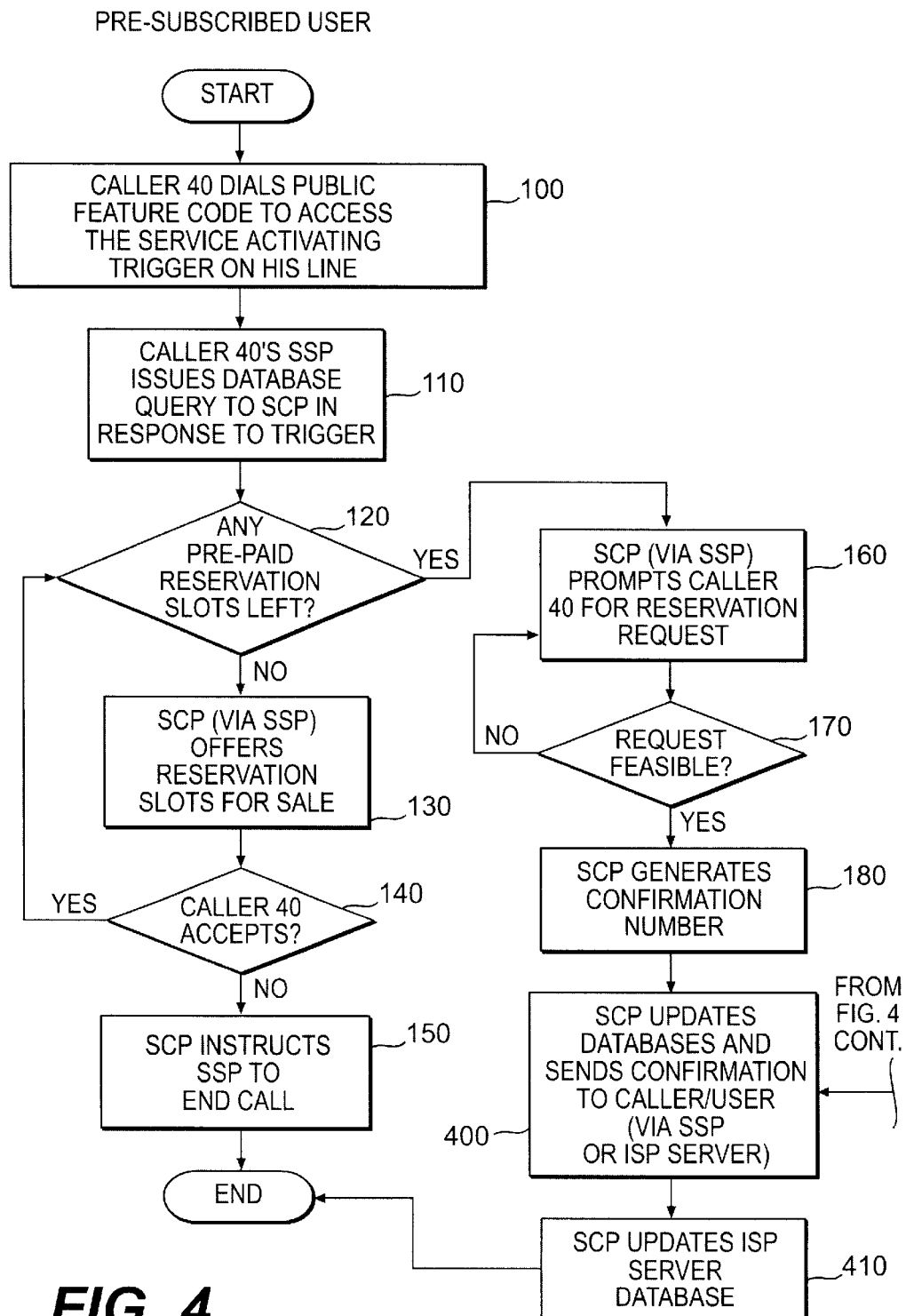
FIG. 4 is a flowchart showing the steps for establishing reservations in an embodiment of the present invention.
Figure 4:
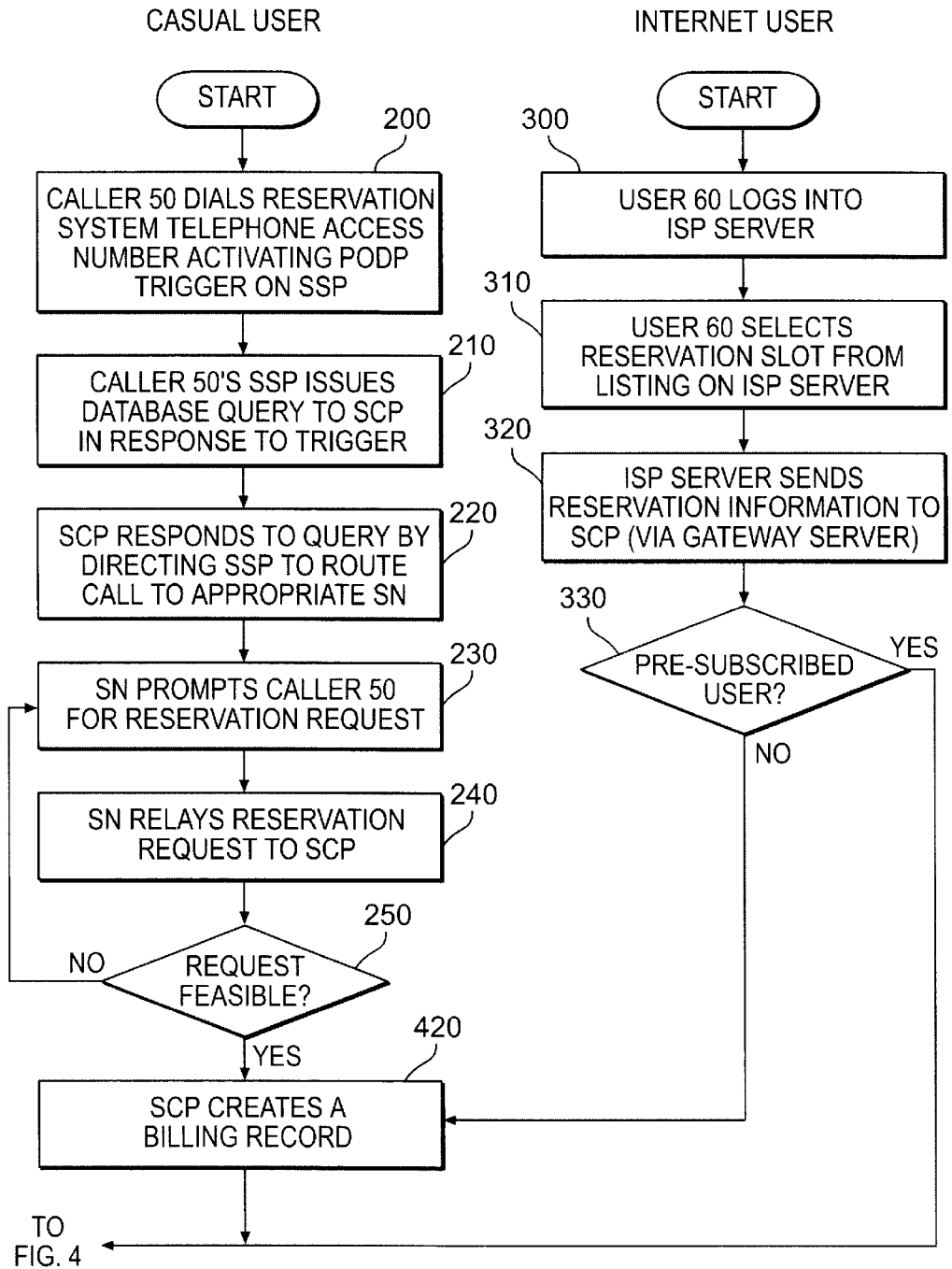

The present invention allows reservation requests to be placed using either the PSTN or the Internet. As discussed above, a user may be either a pre-subscribed user or a casual user, depending on the user's preferences. Thus, as shown in FIG. 4, the sequence of steps performed depends on the source and type of reservation request. Steps 100–170 are unique to reservations placed over the PSTN by pre-subscribed users. Steps 200–250 are unique to reservations placed over the PSTN by casual users. Steps 300–330 are unique to reservations placed by either type of user over the Internet. Steps 400–430 are common to one or more of the reservation setup procedures as shown in FIG. 4. Each reservation setup procedure is described in more detail below.

A. Pre-Subscribed User

In one embodiment, a pre-subscribed user accesses the reservation system by dialing a standard telephone number that has been provisioned with a public office dialing plan ("PODP") trigger. When the pre-subscribed user dials this telephone number, the trigger initiates a database query from the subscriber's SSP to the SCP. However, to make the pre-subscription service more valued by the subscriber, simplified dialing and billing procedures to access the system are desirable.

Figure 5:
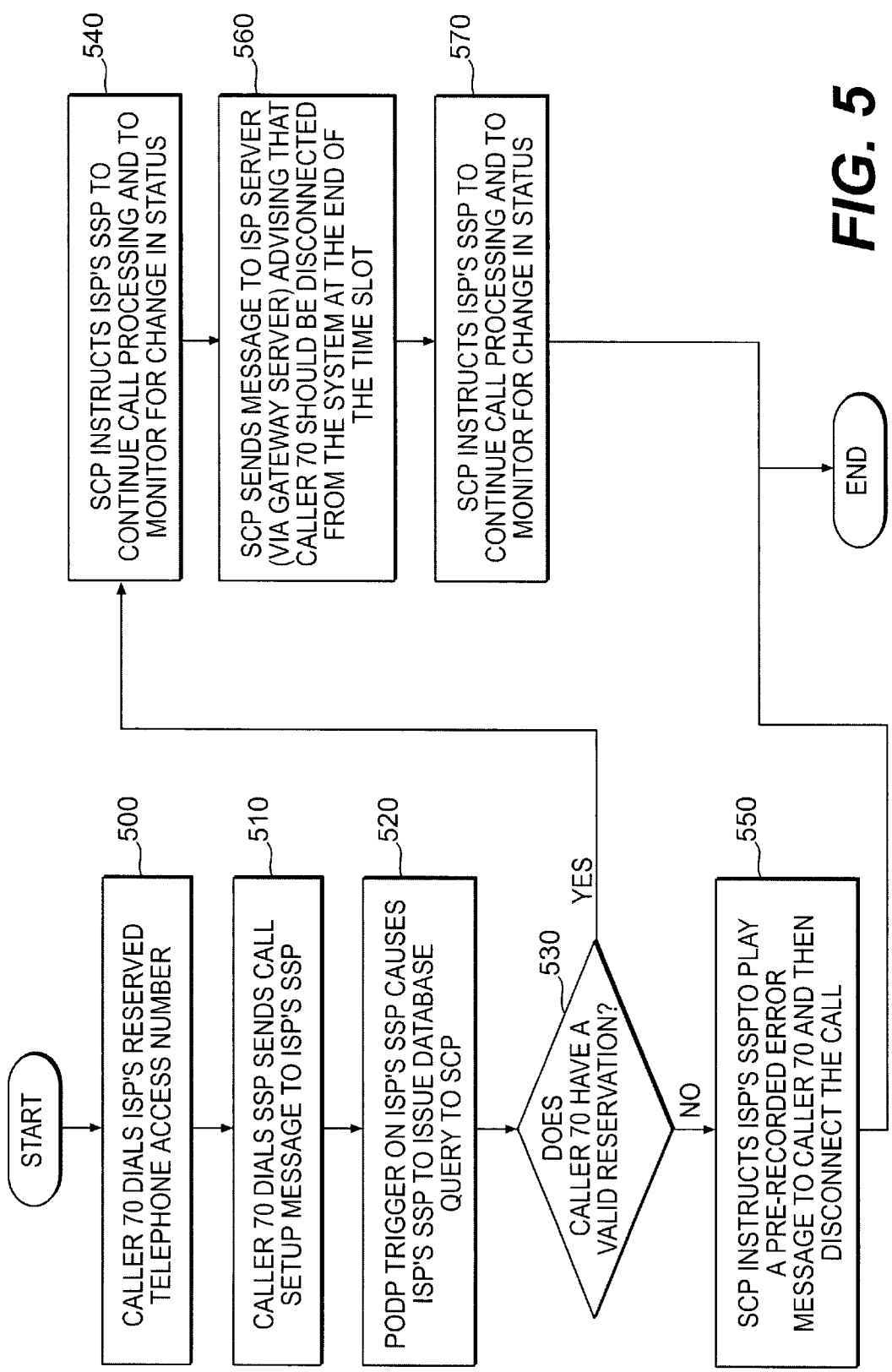
FIG. 5 is a flowchart showing the steps for accessing reserved time slots in an embodiment of the present invention.

In a preferred embodiment, when a user pre-subscribes to the service, the telephone service provider places a Public Feature Code ("PFC") trigger on the subscriber's telephone line. For example, assume caller 40 in FIG. 2a is a pre-subscribed user of the reservation system of the present invention. Thus telephone subscriber line 41 would have been provisioned with the PFC trigger at local SSP 11 when caller 40 became a pre-subscribed user. To schedule a reservation with the system, caller 40 dials the assigned feature code, e.g., *99, using telephone 42, which is connected to subscriber line 41 (step 100). Upon receipt of the last digit in the PFC, SSP 11 issues an Info_Analyzed message in query 1 to SCP 13 (step 110). As shown in FIG. 2a, this query is sent via the SS7 network 15 for routing to SCP 13. Query 1 contains standard AIN parameters such as the Calling Party ID ("CgPN"), Collected Digits and Trigger Criteria Type. For more information, see Bellcore Specification TR-NWT-001284, Switching Systems Generic Requirements for AIN 0.1, which is incorporated herein by reference in its entirety. SCP 13 looks up caller 40, i.e., looks up the CgPN, in database 13a, and verifies that caller 40 has at least one remaining pre-paid reservation slot (step 120). More specifically, in a preferred embodiment, SCP 13 checks to see that the Pre_Paid_Remaining field in the subscriber table has a value greater than zero. If caller 40 does not have any remaining pre-paid reservation slots, SCP 13 instructs SSP 11 to play a message to caller 40 indicating that no pre-paid reservations are left. In a preferred embodiment, SCP 13 (via SSP 11) offers to sell additional pre-paid reservation slots to caller 40 (step 130). If caller 40 accepts the offer (step 140), SCP 13 returns to step 120 as shown in FIG. 5. If caller 40 rejects the offer, SCP 13 moves on to step 150 and the call is ended. In an alternate embodiment, the offer in step 130 also offers a pay-per-use billing scheme for callers who have used all of their monthly pre-paid reservations.

If caller 40 has a pre-paid reservation slot available (step 120), response 2 from SCP 13 instructs SSP 11 to play a message and collect the information required to setup the reservation (step 160). Such information includes the requested time slot, and the ISP's identity, if the caller uses multiple ISPs. SSP 11 relays this collected information to SCP 13 which checks to see if the ISP has any slots remaining for the time slot selected by caller 40. In a preferred embodiment, SCP 13 checks the Slot_Used (Time_Slot, Number_Used, Confirmations) field in the ISP table to see if any slots remain in the time slot selected (step 170). If caller 40's requested time slot is not available, SCP 13 returns to step 160 and the caller is again prompted for a request. In an alternate embodiment, SCP 13 instructs SSP 11 to play a message informing caller 40 to select a different time slot before returning to step 160. The system repeats steps 160 and 170 until the caller's reservation is made, or until the caller hangs up.

If there are slots available, SCP 13 subtracts a slot from the Number_Used and generates a confirmation number to add to the Confirmation_Numbers field (step 180). In step 180, SCP 13 also updates the subscriber table to record the reservation. In a preferred embodiment, the confirmation number and time slot are stored in the Confirmation_ Numbers (Slot, Confirmation) field. In step 400, the databases are updated and the confirmation number is provided to the caller. In step 410, the Reservation Setup process is complete when SCP 13 sends a message via gateway server 16 to the ISP 20 providing updated information regarding the time slots available. This step ensures that users making reservations directly though their ISPs are provided with accurate information.

B. Casual User

Infrequent users, or "casual users," may use the reservation system of the present invention, but they must provide billing and ISP information with each use. Casual users access the reservation system by dialing a telephone number assigned to the service. Referring to FIG. 2b, the reservation system is assigned a telephone line and telephone number, e.g., 212-222-1000, on Service Switching Point ("SSP") 11. At SSP 11, a suitable AIN trigger is provisioned on the reservation system's assigned telephone line. In a preferred embodiment, the trigger is a public office dialing plan ("PODP") trigger. When caller 50 dials telephone number 212-222-1000 (step 200), the PODP trigger prompts SSP 11 to send database query 1 to SCP 13 (step 210). Query 1 is sent via SS7 network 15 for routing to SCP 13. In response 2, SCP 13 instructs SSP 11 to direct the incoming call to a Service Node ("SN") (step 220). As shown in FIG. 2b, SCP 13 may select one of many Service Nodes, SN 14a, 14b and 14c available in telephone network 10. The PODP query is used to trap the call, thereby allowing SCP 13 to direct the call to the appropriate SN. In this example, SCP 13 directs the call to SN 14c.

Once the call is connected, SN 14c plays a series of pre-recorded messages prompting for information from caller 50 (step 230). For example, caller 50 may be prompted to provide the ISP name, the permission to bill the caller for using the service, and the time slot requested. SN 14c communicates with SCP 13 via interconnect 27a to relay the collected information (step 240). Interconnect 27a may use any suitable data transmission protocol, such as TCP/IP. In a preferred embodiment, interconnection 27a employs the X.25 packet switching protocol. In step 250 SCP 13 attempts to book the reservation request. If the requested reservation is not feasible, SCP 13 returns to step 230 and caller 50 is prompted to select a different reservation time slot. If the requested time slot for the requested ISP is available, SCP 13 creates a billing record for caller 50 as described below. After the billing record has been created, SCP 13 provides the confirmation number and updates the databases and servers as described in part A above (steps 400 and 410).

The billing record is created and stored in database 13a on SCP 13 each time a casual user places a reservation through the system of the present invention (step 420). In a preferred embodiment, the billing records created are standard records commonly used in telephone billing systems. Telephone billing systems and records used in AIN systems are described in U.S. Pat. No. 5,774,533, referenced above. Billing records created by the reservation system of the present invention are periodically transferred, in aggregate form, to billing system 28 (shown in FIG. 2a). Records are transferred from SCP 13 through Service Management System ("SMS") 29 (shown in FIG. 2a) to billing system 28 via interconnects 27b and 27c. Interconnects 27b and 27c may use any suitable data transmission protocol, such as TCP/IP. In a preferred embodiment, interconnects 27b and 27c employ the X.25 protocol as shown in FIG. 2a. By storing the billing records in database 13a, and forwarding them to billing system 28 at a later time, SCP 13 maintains full control over billing of casual users of the reservation system. Thus, the reservation system of the present invention may be configured such that casual users who cancel their reservations within a certain time period are not billed. For example, the system could be configured to allow a casual user to cancel a reservation without penalty if the cancellation request is made more than two hours prior to the scheduled start of the reserved time slot.

C. Internet User

Figure 2C:
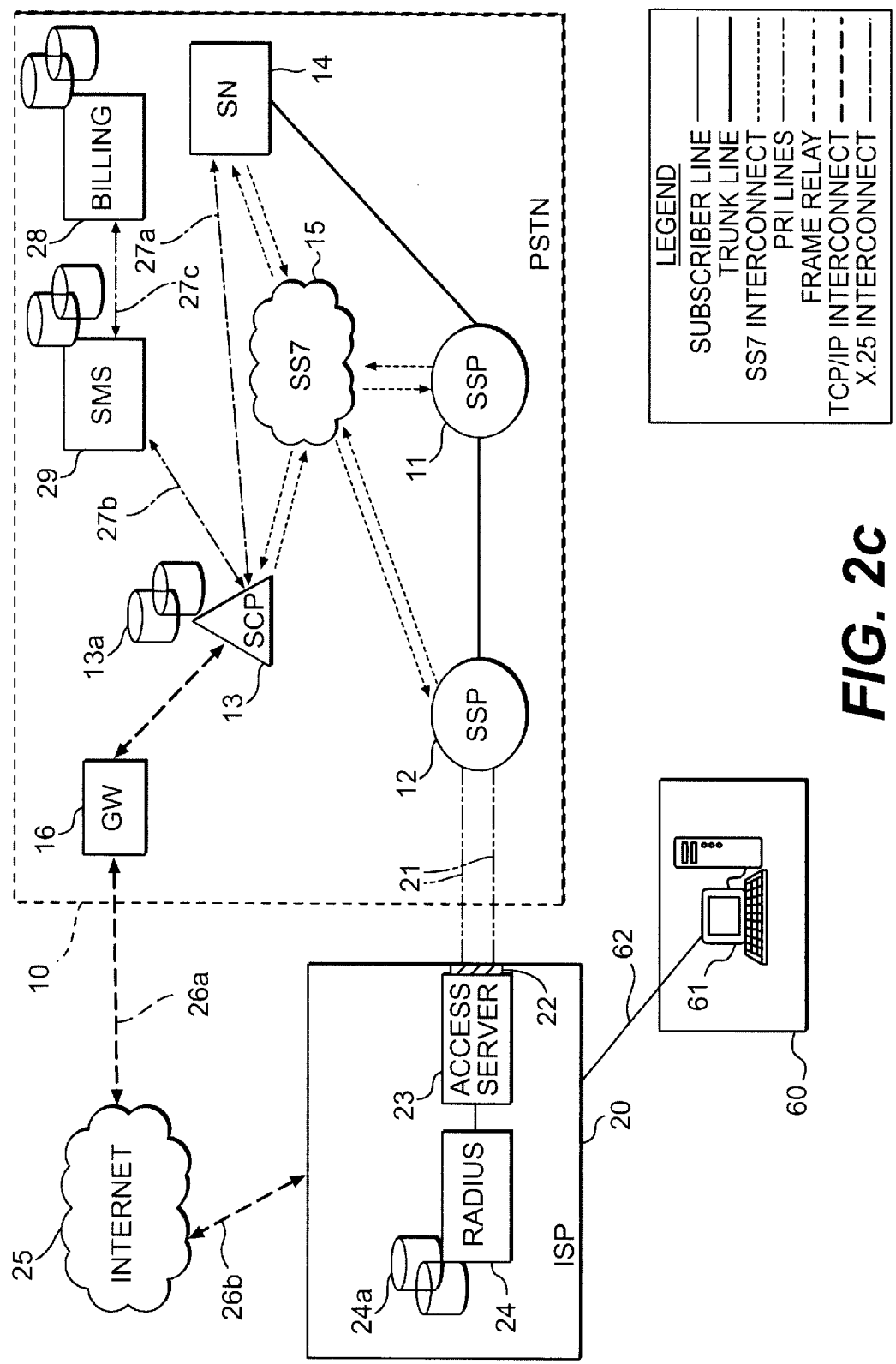
FIG. 2c is a schematic diagram showing the key components of an AIN used in an embodiment of the present invention, in which either a pre-subscribed user or a casual user places a reservation over the Internet.
Figure 3:
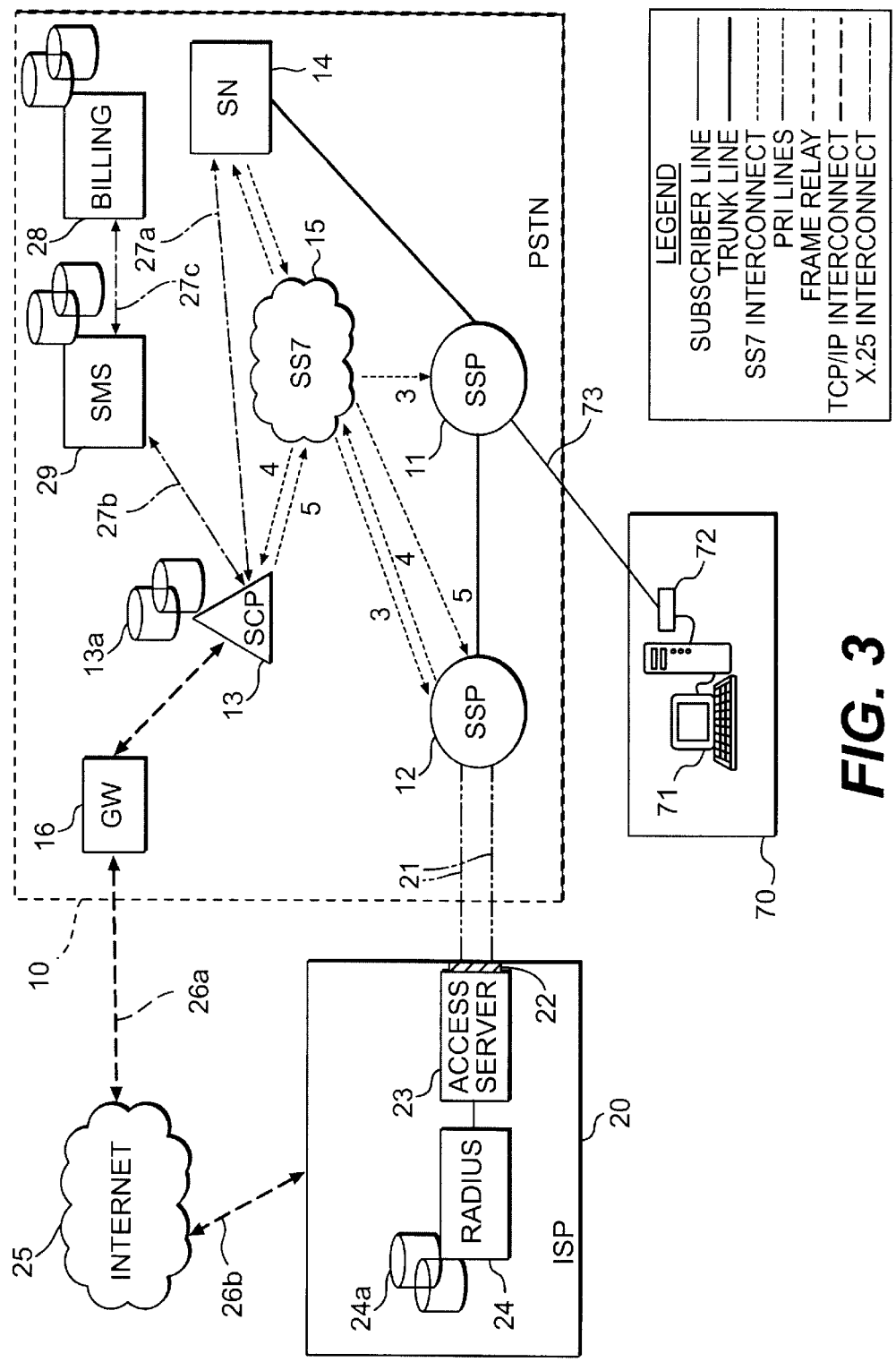
FIG. 3 is a schematic diagram showing the key components of an AIN used in an embodiment of the present invention, in which a caller attempts to connect to an Internet Service Provider via the provider's reserved telephone access number.

Referring to FIG. 2c, ISP 20 may offer dial-up reservation services directly to user 60 who is already logged-in using computer terminal 61 and TCP/IP interconnect 62. As known in the art, TCP/IP interconnect 62 may be, e.g., a dial-up connection using Point-to-Point Protocol ("PPP") or may be a direct network connection. In a preferred embodiment, ISP 20 maintains a server having a world-wide-web interface providing subscribers access to the reservation system. Through this web interface, the subscriber can view a list of time slots available for reservation. User 60 logs into ISP 20 and is provided a list of reservation slots available on ISP 20 (step 300). User 60 enters reservation request, including the telephone number from which the reservation will be accessed and the telephone billing information (step 310). The billing number will normally be the number that the subscriber calls from when using the reserved time slot. However, the billing number could be different from the telephone number that will be used to access the reserved time slot, provided proper verification is made. After collecting the reservation information from the subscriber, ISP 20 sends the reservation information to SCP 13 via gateway server 16 (step 320). In step 330, SCP 13 determines whether or not the user is a pre-subscribed user. If user 60 is not a pre-subscribed user, a billing record is generated in step 420. Otherwise, SCP 13 records the request in database 13a and issues a confirmation number (step 400). The confirmation number is transmitted back through gateway server 16 to ISP 20, which informs the user of the confirmation number. SCP 13 then updates the ISP's reservation listing (step 410).

D. Remote Users

In an alternate embodiment of the present invention, subscribers may access the reservation system from a "remote" location. Subscribers may place reservations in the reservation system using any of the three methods described above, and additionally indicate that actual access to the ISP's reserved telephone number will be made from a telephone number other than the subscriber's normal home (or work) telephone number. In this embodiment, database 13a on SCP 13 has an additional field to indicate the subscriber's remote access number. The subscriber is provided a confirmation number as described above which is used to verify the subscriber's reservation during the reservation processing stage.

Reservation Processing

FIG. 3 is a schematic diagram showing a subscriber, caller 70, using the Internet reservation system of the present invention to access caller 70's ISP during a reserved time slot. FIG. 5 is a flowchart showing the steps for accessing reserved time slots. In step 500, the reservation processing stage begins when a subscribed user dials the ISP's reserved telephone access number (step 500). The reserved telephone access number corresponds to PRI lines 21 connected to SSP 12 in FIG. 3. The reserved telephone access number is provisioned with a PODP trigger at SSP 12. In one embodiment of the present invention, the reserved telephone access number is individually provisioned with the PODP trigger on each SSP in telephone network 10. However, in a preferred embodiment, only the ISP's SSP need be so provisioned. In FIG. 3, caller 70 dials the reserved telephone access number using computer 71 and modem 72 attached to subscriber line 73. SSP 11 sends call setup message 3 to SSP 12 via SS7 network 15 (step 510). When SSP 12 receives call setup message 3, the PODP trigger on the telephone access number causes SSP 12 to send database query 4 to SCP 13 (step 520). SCP 13 queries database 13a to ensure that caller 70 has a valid reservation for the called ISP during the current time slot (step 530). If so, response 5 from SCP 13 to SSP 12 is a Continue message with a Termination Notification request (step 540). Upon receiving the response, SSP 12 terminates the call to the next available port in MLHG 22. If caller 70 did not have a valid reservation during the time slot, response 5 from SCP 13 instructs SSP 12 to play a rejection announcement to caller 70 and end the call (step 550).

As noted above, in a preferred embodiment, in response 5, SCP 13 issues a Continue message with a Termination Notification request. This request instructs SSP 12 to inform SCP 13 when the final state of the call occurs (i.e., busy, call answered, the caller hung up before answer). SCP 13 uses the information from SSP 12 to update database 13a with the status of the reserved time slot. If caller 70 had ended session with the ISP before the end of the time slot, caller 70 can reinitiate the session, as long as the time slot has not expired. This allows the subscriber to reconnect, as often as required, during the time slot without incurring a new bill for the reservation.

After the call is answered, SCP 13 sends an informational message via gateway server 16 to ISP 20 (step 560). The informational message provides the confirmation number and time slot for the caller. Using this information, ISP 20 can disconnect call the end of the time slot. In a preferred embodiment, once the time slot has expired, the ISP ends the subscriber's session by forcing its modem to hang up the call. In an alternate embodiment, the ISP first provides a warning to the subscriber and offers an opportunity to extend the session if a reservation slot is available. If no reservation slots are currently available, the ISP allows the subscriber to place a reservation for a future date and time. A subscriber that is disconnected from the reserved telephone access line is free to reconnect to the ISP via an unreserved telephone access line. If the reserved session is extended, the ISP sends an update message to SCP 13 (via gateway server 16). The update message instructs SCP 13 to bill the subscriber accordingly. In the final step, SCP 13 aggregates billing records and sends them on to billing system 28 via SMS system 29 (step 570).

In another embodiment, in place of step 500, SCP 13 initiates the call between the subscriber and ISP 20. In this embodiment, SCP 13 issues a Create_Call message to SSP 12. The parameters of this message include caller 70's telephone number ("CgPN") and ISP 20's reserved access telephone number. One advantage to this embodiment is that it provides increased security for the reservation system. Only those calls initiated by the SCP will be allowed access to the reserved telephone access lines.

Another embodiment of the present invention provides a reservation "standby system." In this embodiment, SCP 13 maintains a waiting list of subscribers who wish to use the reserved lines during a time slot but who did not have a reservation. In the event that a reserved slot is not used by the reserved subscriber, SCP 13 issues a Create_Call message to SSP 12, as described above. This message provides the telephone number of the first subscriber ("CgPN") and the ISP's reserved access telephone number, as described above.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A method for establishing and processing reservations for telephone connections to internet service providers comprising the steps of:
   (a) determining a caller's internet service provider and a time slot request;
   (b) matching the caller's internet service provider and the time slot request in a database comprising a plurality of internet service provider data, a plurality of respective time slot availability data, and a plurality of subscriber telephone numbers;
   (c) establishing a reserved time slot for the caller; and
   (d) terminating a telephone call between the caller and the internet service provider only when the telephone call is initiated during the reserved time slot.

2. The method of claim 1, further comprising the steps of:
   (e) establishing a second database comprising a subscriber's prepaid slots; and
   (f) subtracting a slot the subscriber's pre-paid slots after the step of reserving a reserved time slot for the caller.

3. The method of claim 1, further comprising the step of provisioning a trigger on a telephone access number for the internet service provider.

4. The method of claim 3, wherein the trigger is a public office dialing plan trigger.

5. The method of claim 1, further comprising the step of provisioning a trigger on a telephone access number for the reservation system.

6. The method of claim 5, wherein the trigger is a public office dialing plan trigger.

7. The method of claim 1, further comprising the step of provisioning a trigger on a telephone number for the caller.

8. The method of claim 7, wherein the trigger is a public feature code trigger.

9. The method of claim 1, further comprising the step of generating a bill after terminating the telephone call in step (d).

10. The method of claim 1, further comprising the step of providing a confirmation number to the caller.

11. The method of claim 10, further comprising the step of verifying the caller's confirmation number before terminating the telephone call in step (d).

12. The method of claim 10, further comprising the steps of verifying the caller's confirmation number and canceling the reserved time slot upon request by the caller.

13. The method of claim 1, wherein step (a) comprises the steps of:
   (i) looking up a calling party number for the caller in the database;
   (ii) playing a pre-recorded message to the caller; and
   (iii) collecting the time slot request from the caller.

14. In an intelligent switched telecommunications network including a switch, a service control point, a service node, a service management system, a gateway server, a method for creating and processing reservations for accessing an Internet service provider during a reserved-time slot comprising the steps of:
   (a) establishing a database on the service control point, the database comprising a list of time slots, a number of ports available during the time slots, and a reserved telephone access number;
   (b) receiving a reservation request on the service control point, the reservation request comprising a requested time slot and a first calling party number;
   (c) determining whether the reservation request is feasible by comparing the reservation request to the database;
   (d) if the reservation request is feasible, creating a reservation and updating the database on the service control point;
   (e) in response to a telephone call from a subscriber to the reserved telephone access number, sending a data query from the switch to the service control point, the query comprising a trigger code, the reserved telephone access number and a second calling party number;
   (f) determining whether the subscriber has a valid reservation by comparing the trigger code, the reserved access telephone number, the second calling party number and a time period to the database; and
   (g) if the subscriber has a valid reservation, terminating the telephone call from the subscriber to the reserved access telephone number.

15. The method of claim 14, further comprising the step of billing the second subscriber after the terminating the telephone call.

16. The method of claim 14, wherein the step of receiving the reservation request further comprises the steps of playing a series of pre-recorded messages from the service node to the first subscriber, collecting a plurality of digits entered in response to the series of pre-recorded messages and transmitting the plurality of digits from the service node to the service control point.

17. The method of claim 16, further comprising repeating steps (b), (c) and (d) until the reservation request is feasible.

18. The method of claim 14, wherein the step of receiving the reservation request further comprises the steps of collecting the reservation request at a computer server and transmitting the reservation request from the computer server to the service control point.

19. The method of claim 18, further comprising the step of repeating steps (b), (c) and (d) until the reservation request is feasible.

20. A telecommunications system for creating and processing reservations for accessing an internet service provider during a reserved time slot comprising:

(a) a first switch comprising a first trigger provisioned on a reservation system number;

(b) a second switch comprising a second trigger provisioned on an Internet reserved access number;

(c) a service control point in communication with the first and second switches comprising a means for processing a reservation request from a subscriber and a means for determining if a telephone call from the subscriber to the Internet reserved access number is made during a valid reservation period; and (d) an access server in communication with the service control point comprising a means for disconnecting the subscriber from the Internet reserved access number when the valid reservation period expires.

21. The telecommunications system of claim 20, further comprising a service management system in communication with the service control point and a billing system in communication with the service management system.

22. The telecommunications system of claim 21, wherein the billing system bills the subscriber when the service control processes a reservation request.

23. The telecommunications system of claim 20, wherein the service control point further comprising means for determining whether the subscriber is a pre-subscribed user or a casual user.

24. The telecommunications system of claim 20, wherein the first trigger is a public office dialing plan trigger.

25. The telecommunications system of claim 20, wherein the second trigger is a public office dialing plan trigger.

26. The telecommunications system of claim 20, wherein the first switch and the second switch are the same switch.

27. The telecommunications system of claim 20, further comprising a third switch comprising a third trigger provisioned on a telephone number for the subscriber.

28. The telecommunications system of claim 27, wherein the third trigger is a public feature code trigger.

29. The telecommunications system of claim 20, wherein service control point initiates the telephone call from the subscriber to the Internet reserved access number.

30. The telecommunications system of claim 20, wherein the means for disconnecting the subscriber comprises a means for issuing a warning to the subscriber prior to disconnecting the subscriber.

31. A telecommunications network comprising:

(a) a service control point in communication with a service switching point;

(b) a trigger provisioned on the service switching point that prompts a query from the service switching point to the service control point whenever a subscriber initiates a telephone call to an Internet service provider's telephone access number during a particular time slot, said query asking the service control point to confirm that the subscriber has reserved a time slot on the internet service provider;

(c) a database in communication with the service control point containing a list of reserved time slots and telephone numbers that have reserved the reserved time slots; and (d) a service package application on the service control point that checks the database and sends an authorization for terminating the call to the internet service provider if the subscriber has reserved the particular time slot.

32. The telecommunications network of claim 31, wherein said authorization comprises a continue message and a termination notification request.

33. The telecommunications network of claim 32, wherein the service switching point notifies the service control point whether the internet service provider answered the call.

34. A telecommunications network comprising:

(a) a service control point in communication with a service switching point; and (b) a database in communication with the service control point containing a list of reserved time slots and telephone numbers that have reserved the reserved time slots,
    wherein the service control point instructs the service switching point to establish a call from a subscriber to an internet service provider according to a table in a database that contains subscriber numbers and time slots reserved for the subscriber numbers.

35. The telecommunications network of claim 34, wherein the service control point issues a create call message to the service switching point when the reserved time slot arrives.

36. The telecommunications network of claim 35, wherein the service control point issues a termination notification request to the service switching point when it issues the create call message.

* * * * *